Feb. 17, 1970    B. R. WELCH    3,495,662
AUTOMATIC CONTROL SYSTEMS
Filed March 20, 1967    5 Sheets-Sheet 1

United States Patent Office 3,495,662
Patented Feb. 17, 1970

3,495,662
AUTOMATIC CONTROL SYSTEMS
Brian Richard Welch, Nuneaton, England, assignor to Associated Electrical Industries Limited, London, England, a British company
Filed Mar. 20, 1967, Ser. No. 624,284
Claims priority, application Great Britain, Mar. 25, 1966, 13,411/66
Int. Cl. A01b 69/04, 67/00; B62d 5/04
U.S. Cl. 172—3                                9 Claims

ABSTRACT OF THE DISCLOSURE

An automatic tractor control system utilizing an array of parallel underground guide wires extending between transverse underground guide wires which define the headlands of the area under cultivation. One or more signal wires extending parallel and close to the transverse wires are provided, and in response to signals from these latter wires the tractor implements are arranged to be lifted and a turn away from one of the parallel guide wires towards a transverse wire is initiated.

CROSS REFERENCES TO RELATED APPLICATIONS

Cross references are made in the specification to our U.S. Patent 3,294,178 and our British Patent 962,349.

BACKGROUND OF THE INVENTION

The present invention relates to automatic control systems and in particular to such systems for controlling and guiding a self-propelled vehicle or vessel by means of energised guide wires.

Systems operating on the above principle are known and can be applied for example to guiding and controlling a tractor over land to be worked by an arrangement of buried guide wires such as that shown in FIGURE 1 of the accompanying drawings. Here a field is divided into eight strips and a wire W is laid along each strip. These wires are interconnected along the headlands H1 and H2 as shown to form closed loops. The interconnection wires lie co-extensively over a portion P of their length. Thus a tractor having a suitable sensing head responsive to a radiated signal from a wire to control the direction of motion such that the tractor will follow the direction of that particular wire, can be made to change from one wire loop to follow another by de-energising the first wire and energising another whilst the tractor is at the portion of co-extensive lay.

It is also possible to arrange for the tractor to follow successive paths parallel to an energised wire but laterally offset from each other so that, for example, a strip of land which is eighteen feet wide can be worked from a single wire with an implement say three feet wide by allowing the tractor to complete six "laps" round a loop, being laterally displaced three feet on each lap.

A wire may be laid transversely to the guide wires for controlling lifting of an implement clear of the ground as the tractor approaches the headlands and again for lowering the implement when the tractor leaves the headland.

Various disadvantages are experienced with the above basic arrangement. For example, it is difficult to lay the guide wires with sufficient accuracy on the curves where the guide wires converge with the headland wires. Also the field pattern does not lend itself to versatility of operation, and owing to the curves at the ends of the guide wires the headlands are necessarily wide. Clearly also a considerable amount of time is spent on the headlands.

SUMMARY OF THE INVENTION

In accordance with the present invention an electrical system for a self-propelled and automatically-steerable vehicle having means for automatically following a path defined by an electrically-energised guide wire, comprises one or more such guide wires defining at least two intersection paths for the vehicle, means for providing an initiating signal at a predetermined position of such vehicle travelling along one of said two paths towards the intersection therebetween, vehicle borne turning control means operable to turn the vehicle from a direction along said one path to a direction along the other path, and vehicle-borne turn initiating means responsive to said signal for initiating a predetermined operation of said turning control means. The initiating signal can be derived from an energised signal wire crossing the wire of the first path at the predetermined position. The predetermined operation can be arranged to turn the vehicle on a small turning arc by the use for example of differential braking as well as by conventional steering; in the particular application of the invention to controlling a tractor having an implement for working a land area, small turning arcs are highly desirable in order to be able to work the land as close as possible to its edges. The invention also enables the guide wires to be laid in straight lines without the need for curving the end portions round to the direction of a headland wire as illustrated in FIGURE 1 for example.

The predetermined operation can be arranged to effect either a right-hand or a left-hand turn dependent upon a particular initiating signal received, for instance, dependent upon which one of two frequencies is applied to a signal wire as an initiating signal.

BRIEF DESCRIPTION OF THE DRAWINGS

In order that the invention may be more clearly understood reference is made to the figures of the accompanying drawings, in which.

DESCRIPTION OF THE PREFERRED EMBODIMENT

Figure 1:
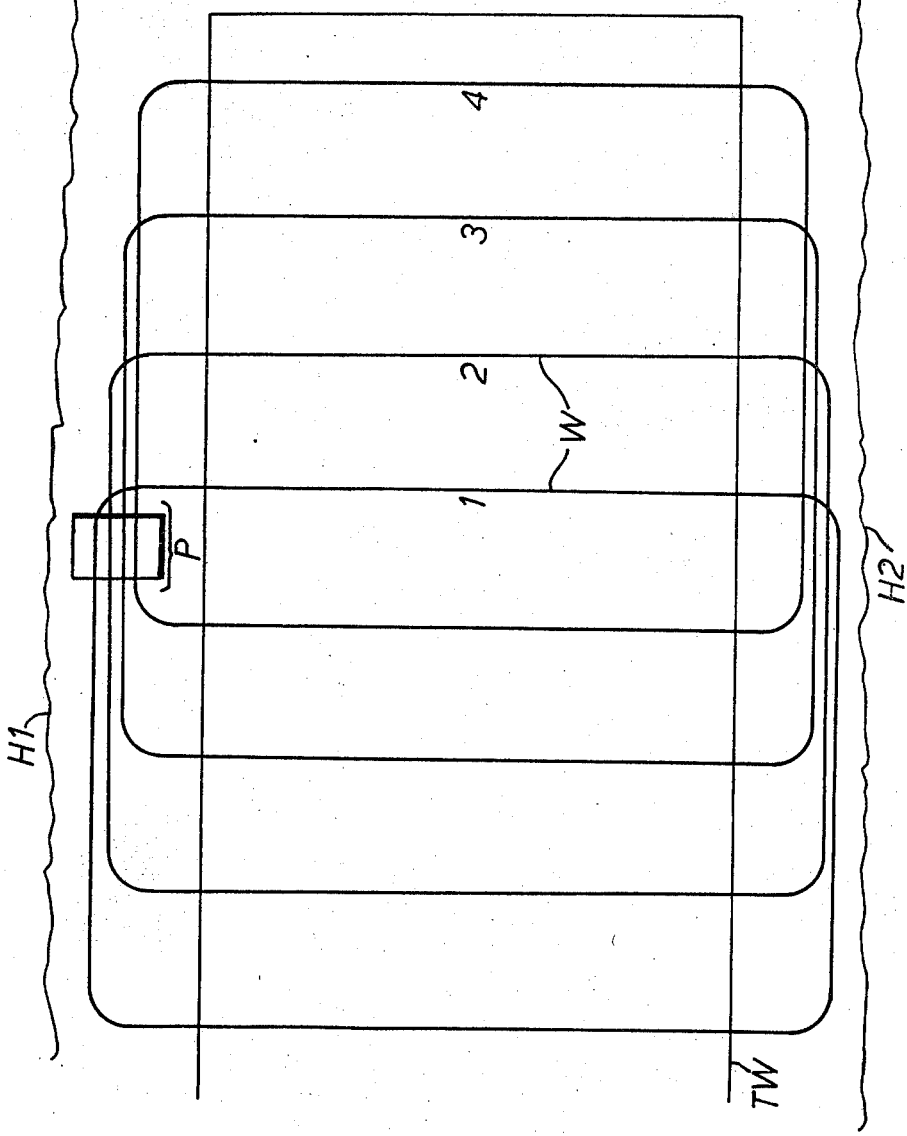
FIGURE 1, discussed hereinabove, shows a known layout of guide wires.
Figure 2:
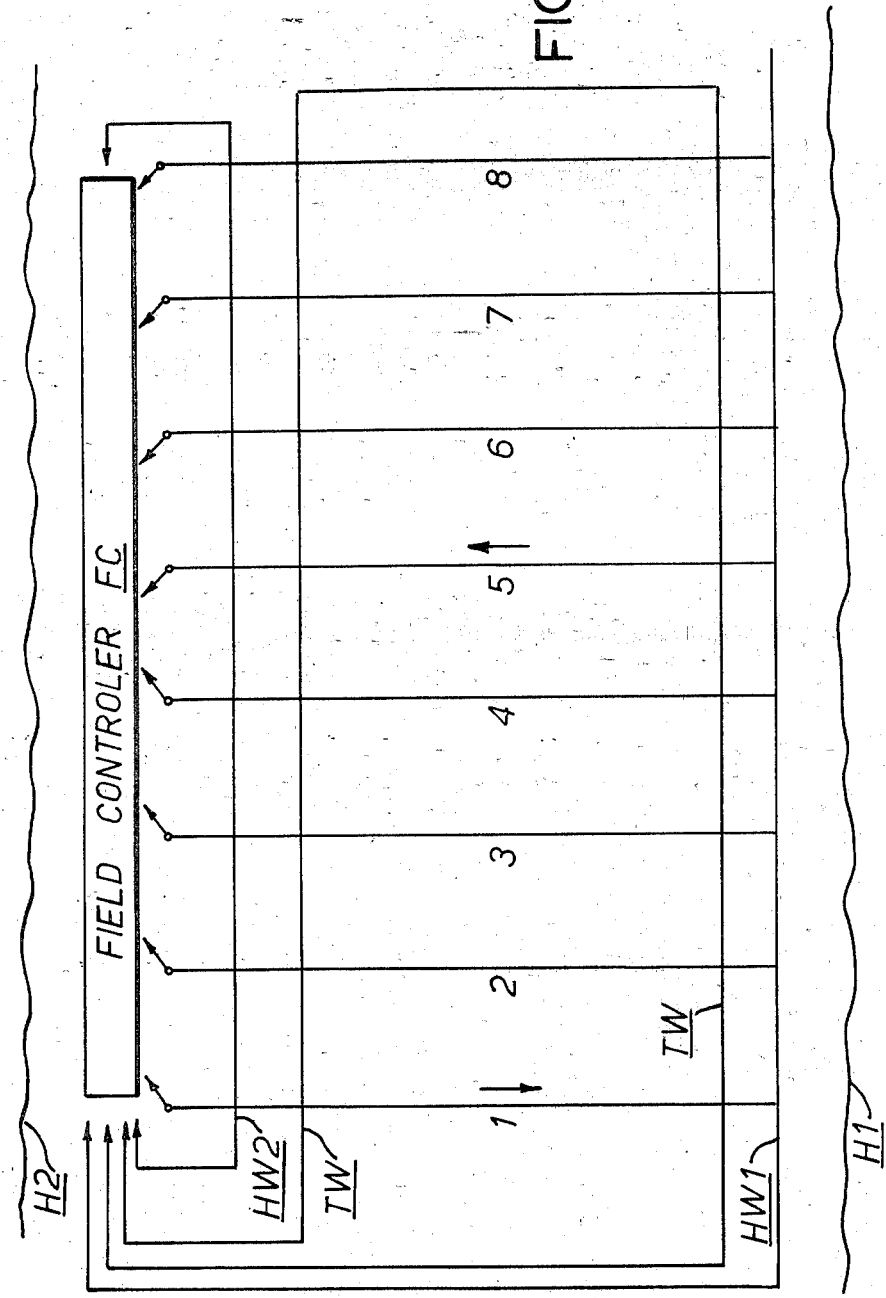
FIGURE 2 shows a proposed layout of guide wires and signal wire for a rectangular land area.

Referring to FIGURE 2 a land area which is to be worked by an implement drawn or carried by a self-propelled tractor between the boundaries $H_1$ and $H_2$ is laid with a parallel system of field guide wires numbered 1 to 8 in sequence. These field wires are connected at one end in common to a first headland guide wire HW1 and at the other end to a field controller FC for selectively energising the field wires. At this other end of the land area a second headland wire HW2 is laid as shown. A signal wire TW crosses each of wires 1 to 8 at two positions which are situated small distances along the guide wire from the headland wire.

Figure 3:
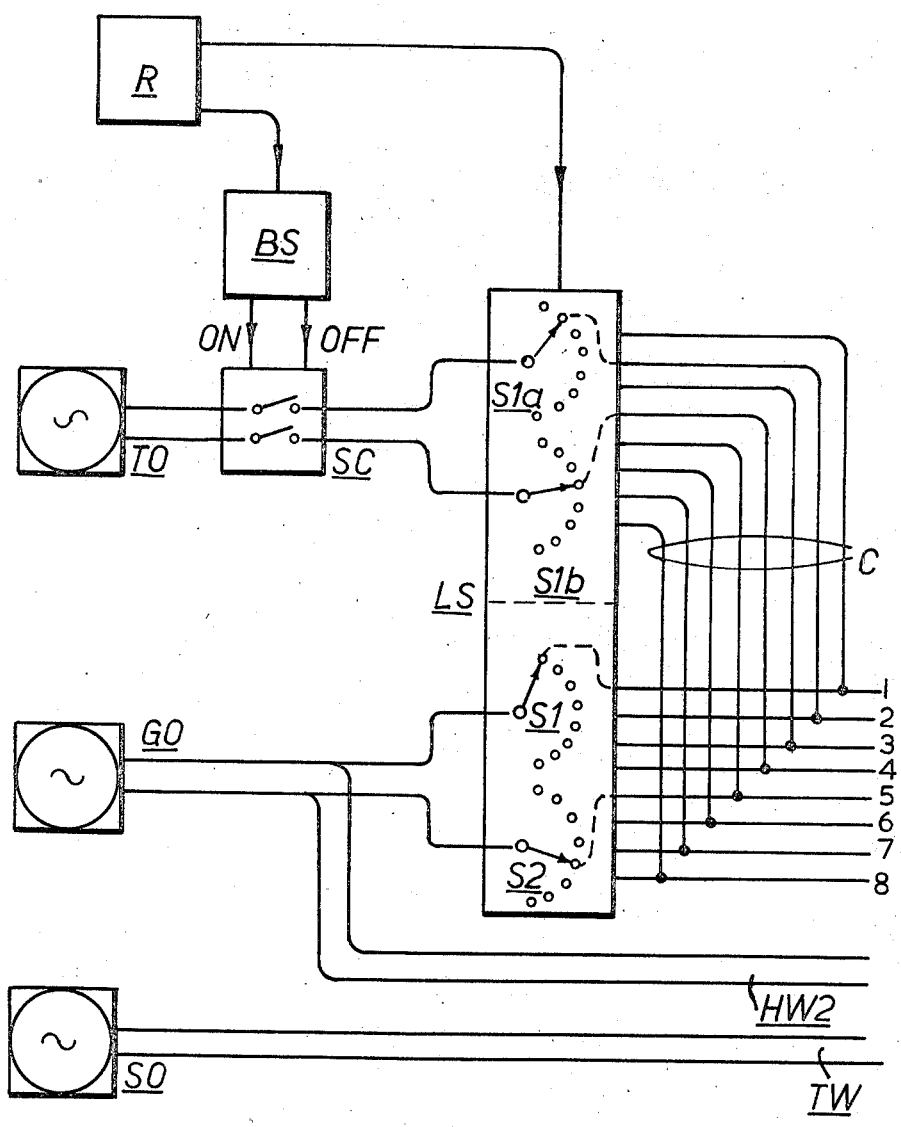
FIGURE 3 shows in block schematic form a circuit switching arrangement for a field controller for selectively energising field guide wires.

In the field controller of FIGURE 3 the connection ends of the field guide wires 1 to 8 are connected in a loop selector LS to the fixed contacts 1 to 8 of two rotary selector switches S1 and S2, these contacts being commoned by commoning connections C to corresponding fixed contacts of rotary switches S1a and S1b. The field guide wires are selectively energised from an oscillator GO at a guide frequency $fg$ via switches S1 and S2, and the headland wire HW2 is energised at the same frequency $fg$ from the oscillator.

The field guide wires can also be energised from oscillator TO via switching circuit SC. This circuit is controlled by a bistable circuit BS responsive to a signal received from the tractor through the receiver R. A second link from the receiver is connected to the loop selector LS which is responsive on receipt of another signal from the tractor to control the selection of field wires to be energised. The signal wire is energised from an oscillator SO.

Figure 4:
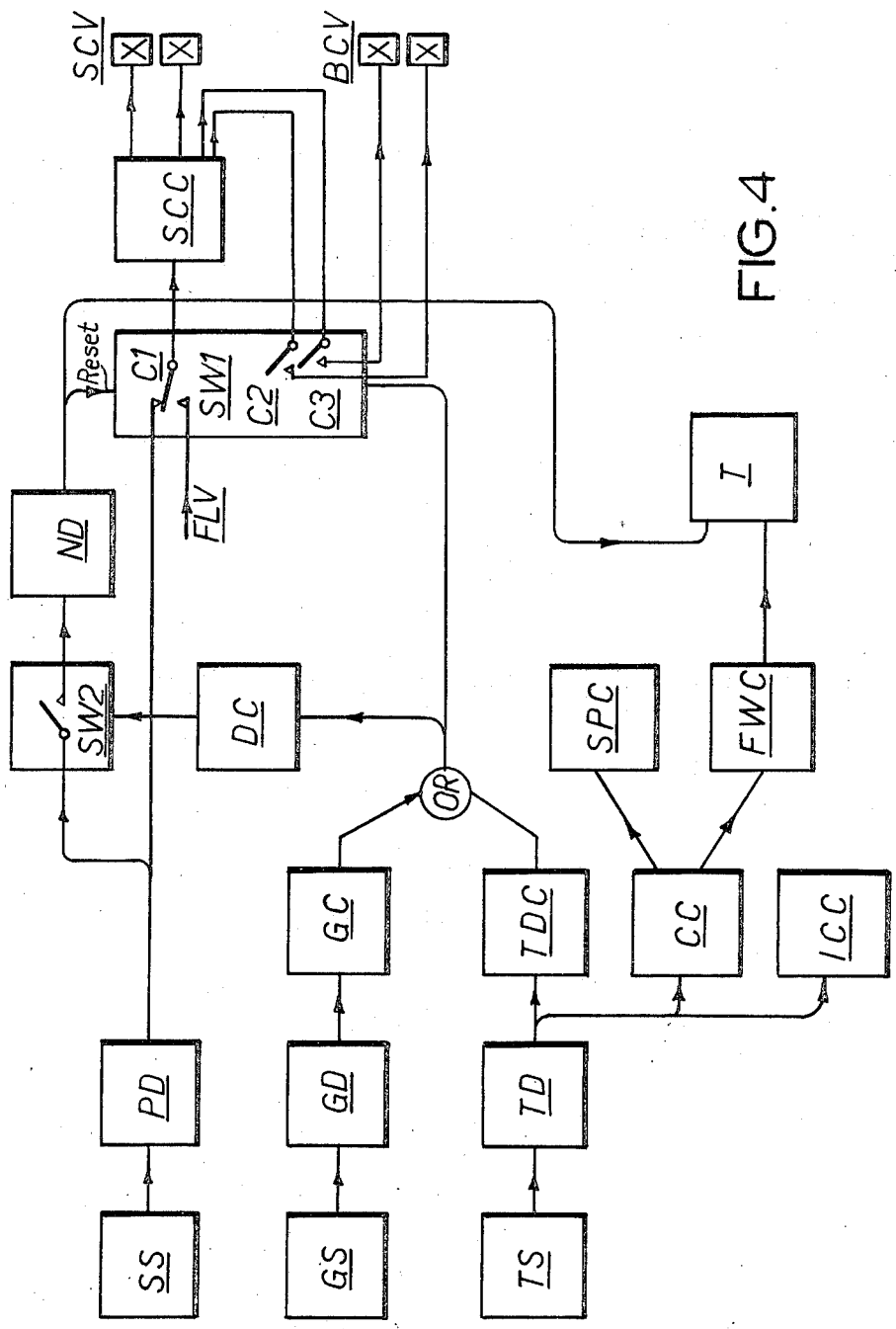
FIGURE 4 shows in block schematic form a circuit arrangement for the equipment carried by a tractor to enable it to follow a layout as shown in FIGURE 2, and FIGURES 5 and 6 show modified circuit arrangements for respectively the arrangements of FIGURES 4 and 3.

Referring now to FIGURE 4 the tractor has mounted for example on a boom supported across the tractor three sensing heads, one SS for sensing the radiation from a guide wire enabling the tractor to follow the path of the guide wire by controlling the steering of the wheels, a second TS responsive to radiation from the signal wire for initiating a predetermined operation aboard the tractor for causing the tractor to turn away from a field guide wire and into line with a headland wire, and a third head GS for sensing radiation from a field guide wire whilst the tractor is following a headland guide wire, to initiate a turn from the headland wire onto the path of the field guide wire. Response of the sensing head TS also controls in the case illustrated operation of the tractor-drawn implement by respectively raising and lowering it for instance so as to be clear of the ground while the tractor is on the headland. Each of heads TS and GS can be similar to the pick-up means PH described in U.S. Patent 3,294,178 while the steering sensor SS can be similar to that described in British Patent 962,349 onto the sensing head SH described in U.S. Patent 3,294,178.

The steering sensor SS is responsive to displacement from a plane containing the energised guide wire. The output from the steering sensor is passed through a phase detector PD (also described in the above numbered British patent) which produces a resultant output serving as an input to a steering control circuit SCC via a switch SW1. The circuit is arranged to steer the tractor to decrease the output from the head SS and thus the input to the steering control circuit. The steering mechanism of the tractor is actuated by hydraulic rams (not shown) powered from a hydraulic system of the tractor. The steering control circuit SCC of FIGURE 4 is connected for energising solenoid-operated steering control valves SCV which control the position of these rams. When the tractor is accurately following a guide wire there is no output from the phase sensitive detector PD fed by the steering sensor head SS, and hence no input to the steering control circuit SCC, and in this condition the steering wheels are held by the rams rigidly in the straight ahead condition. If the tractor veers off course, the phase sensitive detector PD gives an output of magnitude proportional to the extent of the lateral displacement and of sign corresponding to the direction of displacement. The steering control circuit SCC responds to this signal by operating the valves SCV to produce a deflection of the steering wheels in the appropriate direction and of magnitude proportional to the deflection, so as to bring the tractor back on course.

The output from the signal sensor head TS which may be similar to that described in U.S. Patent 3,294,178 is detected by detector TD and thence passes to a counter CC and to an implement control circuit ICC. The counter counts the number of times the signal sensor head TS is energised. It is connected with a steering sensor position control circuit SPC and a field wire control circuit FWC. The function of circuit SPC is to control the lateral displacement of the sensor head relatively of the tractor in order that the tractor may follow a course laterally offset from but parallel to the guide wire. The field wire control circuit FWC provides an output to a transmitter T which in response transmits a signal to the field controller to change the energisation from one or more wires to other wires in order that an unworked portion of the land area can be started on. Both circuits SPC and FWC are responsive to effect their respective functions after a predetermined number of counts from the counter.

The signal sensor detector TD is also connected via a delay circuit TDC and through an "OR" gate OR to a trigger input of the switching circuit SW1 and through a further delay circuit DC to an input of a switching circuit SW2 which also has an input connection from the steering sensor head SS. A signal from the delay circuit DC originating either from the signal sensor TS or from the guide wire sensor GS will operate the switching circuit SW2 so that a signal from the steering sensor is able to pass through to a null detector ND whose output is connected to a reset connection on switching circuit SW1 and also to the transmitter T.

Signals from the guide wire sensor GS are detected by guide detector GD and counted by a counter GC which is responsive to give an output to the input of gate OR on counting a predetermined number of signals from GS.

A voltage input lead FLV for applying a full lock voltage to the switching circuit SW1 is effective when the circuit is triggered to cause the steering control circuit SCC to turn the tractor away from its original direction by actuation of the steering control valves SCV thereby operating the hydraulic rams connected to the steering mechanism and continue to do so until such time as a reset signal from the null detector ND resets the circuit SW1 for normal control from the steering sensor. In addition to the control of the steering mechanism there is also provided means for effecting differential braking of the rear wheels of the tractor. In this instance the steering control circuit SCC is also made to actuate solenoid operated brake control valves BCV admitting hydraulic pressure to a rear wheel braking system of the tractor to effect differential braking. This is only required while making a programmed turn, and connections of valves BVC is made through additional contacts C2 and C3 in switching circuit SW1. These contacts will be operated in response to triggering of the switching circuit SW1.

With reference to FIGURES 2, 3 and 4 in combination, the operation of the system will now be considered. Suppose the tractor drawing a plough for example is proceeding along the path of guide wire 1 towards headland H1. Guide wire 1 is energised from oscillator GO (FIGURE 3) via switch S1, a field loop being completed by energising via guide wire 5 and switch S2 the common headland wire HW1. When the trip sensor TS (FIGURE 4) on the tractor detects the radiation from the signal wire TW energised from oscillator SO, counter CC registers a count and implement control circuit ICC initiates lifting the plough shares clear of the land by means for example of an electrically actuated hydraulic mechanism. The signal from the trip sensor TS, after a delay provided by the trip delay circuit TDC sufficient to allow the plough shares to be lifted, triggers the switching circuit SW1 to apply the voltage from lead FLV at contact C1 and to operate one or other of contacts C2 and C3 for causing the steering control circuit to effect turning of the tractor by steering and differential braking. The signal from the delay circuit TDC is further delayed by DC sufficiently to allow the tractor to have turned away from the guide wire of its original path so that the steering sensor SS no longer responds to it, and the actuator switching circuit SW2 to connect the null detector ND between the steering sensor SS and the reset connection on the switching circuit SW1. The position of the signal wire and delay of the delay circuits are pre-arranged so that at this time the tractor will be coming into line with headland wire HW1 and when in fact the tractor has turned sufficiently the null detector will respond to the signal from the steering sensor picked up from the headland wire HW1 to reset switching circuit SW1, so that the tractor proceeds as before, and also to signal to the field controller, via the transmitter, that the turn has been completed.

The tractor will proceed along the headland wire, with the plough shares raised, until the tractor passes a guide wire which with regard to the direction of motion of the tractor precedes the other energised wire 5 of the field loop, this preceding guide wire 4 being temporarily energised from oscillator TO via switch S1a as a result of operation of switch SC in response to the transmitted signal from the tractor on completion of the tractor's last turn. When the sensor head GS detects the energised guide wire 4 a similar turning operation will be initiated turning the tractor onto the path of guide wire 5, the signal wire TW then causing the plough to be lowered onto the ground again.

Alternatively although not shown in the drawings it is envisaged that the turn from the headland could be effected by energising all the guide wires between 1 and 5 and having a counter associated with the sensor GS for counting these wires and responsive to initiate the turn onto the path of wire 5 after counting the three wires 2, 3 and 4.

The energisation of the guide wire or wires for causing the tractor to leave the headland will be terminated by the next signal transmitted from the tractor to the field controller on completion of the turn.

The counter CC on the tractor will count successive crossings of the signal wire, this counting being appropriately used for changing the lateral position of the steering sensor to enable adjacent parallel strips of land to be ploughed along the path of one guide wire, and for signalling a "change loop" command through the circuit FWC to the field controller.

For example every fourth time the signal wire is crossed the steering sensor could be shifted one place corresponding to the width of the plough, and if for example three laps of the loop through wires 1 and 5 is sufficient then on counting the signal wire eleven times the "change loop" command will be given to change the energisation to a loop constituted for example by guide wires 2 and 6, and so on.

More complex manoeuvres can be provided for by adding further logic circuits to the tractor control arrangement. For instance if it is required that the tractor return along the same guide wire as it followed to reach the headland, the following manoeuvres could be provided for:

(a) left turn onto the headland
(b) stop
(c) reverse past guide wire
(d) move forward and turn back onto guide wire.

To achieve this, the tractor would make the initial turn at the headland wire as previously described. The output of the null detector which indicates the successful completion of this turn via the transmitter, will be fed to a delay circuit in addition to the connection shown in FIGURE 4. This delay will allow he tractor course to become stabilised in following the headland guide wire. An output from the delay circuit will then cause (a) the tractor to stop, (b) reverse gear to be engaged and (c) reversal of the steering connection to enable the tractor to be steered in reverse along the headland wire. The tractor will then proceed back past the guide wire which it has just left until the sensor GS detects the next guide wire, which will be energised for the purpose. The sensor output would be used to stop the tractor, engage forward gear and restore the normal connection of the steering circuit. Thereafter the turn off the headland back onto the original path will be made as previously described.

Thus by adding a relay circuit, a forward/reverse gear actuator, and switching circuits, the arrangement of FIGURE 4 can be modified to permit a turn onto a reciprocal course. Other manoeuvres can be provided for in similar manner.

A second series of signal wires may be laid at right angles to the field wires shown in FIG. 2. By energising selected wires of the mesh so formed with the guide frequency and other selected wires with the trip frequency, a turn can be initiated at a given point towards the centre of the field. Thus, it is possible to perform an operation, on a selected portion only, of the land area as well as on the whole area.

It is possible to dispense with one of the sensing heads TS and GS on the tractor. It is necessary to differentiate between turning away from a field guide wire to the headland and turning off the headland on to a field guide wire, to enable cultivating implements to be raised clear of the ground before the turn is made in the first case, and lowered after the turn is made in the second case. As described in the preferred embodiment the turn on to the headland is initiated by detection of the crossing of the signal wire TW, while turning off the headland is initiated by detection of the crossing of the field wire next before the tractor is desired to turn on to, and these two wires are fed with frequencies SO and TO respectively. The tractor carries sensing heads TS and GS responsive respectively to these two frequencies. In dispensing with one of the heads it would be possible to employ a common carrier modulated with one signal for feeding to the trip wire and with a different signal for feeding to the field wire. The modulating signals could for example be two audio frequencies. A single sensing head on the tractor would respond to the modulated carrier, and the audio frequencies separated by suitable filters at the output of a demodulator with this head.

Figure 5:
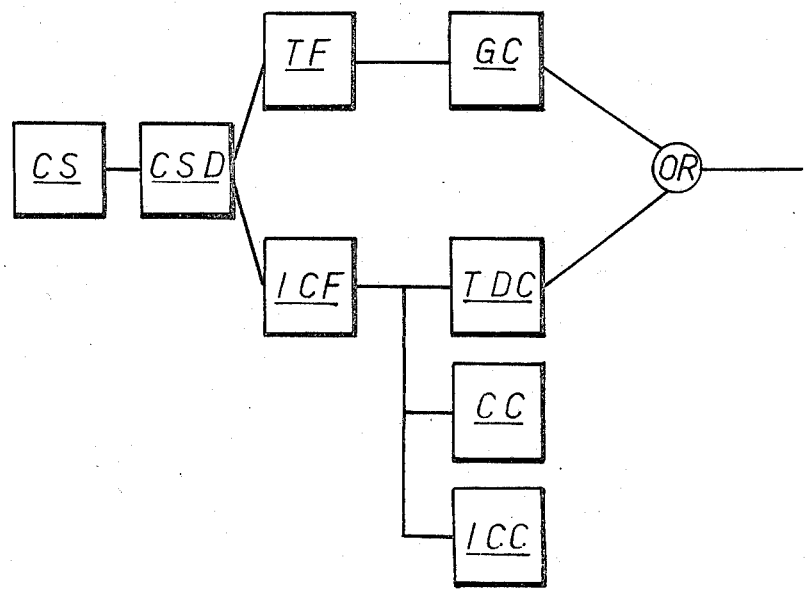

Thus referring now to FIGURE 5 there is shown a modified circuit arrangement for use with one sensing head and which can replace part of the tractor-borne circuitry shown in FIGURE 4 required for the separate sensor heads.

A common sensing head CS sensitive to a carrier modulated by either one of two different frequencies is connected through a demodulator CSD to two filters one of which TF selects the frequency for turning the tractor and the other ICF selected the frequency for implement control. The filter TF is connected to the counter GC of FIGURE 4 in place of head GS and detector GD therein. The filter ICF is connected in common with time delay circuit TDC, counter CC and implement control circuit ICC in place of the head TS and detector TD shown in FIGURE 4.

Figure 6:
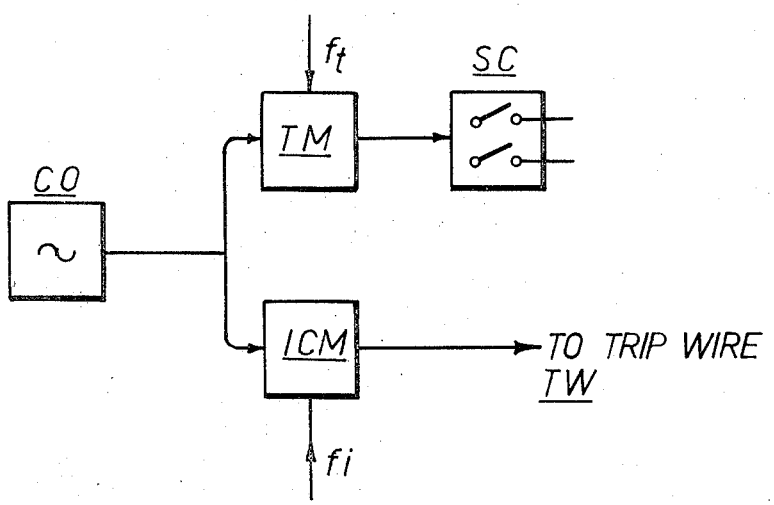

In conjunction with the above modification the circuit switching arrangement shown in FIGURE 3 would be modified in accordance with FIGURE 6, the oscillators TO and SO being replaced by the arrangement of FIGURE 6. In FIGURE 6 a common oscillator CO supplies a carrier frequency to a turn modulator TM and an implement control modulator ICM whereby the carrier is modulated respectively by a turn frequency $f_t$ and an implement control frequency $f_i$, the outputs of the modulators being connected respectively to switching circuit SC and to the signal wires TW. As mentioned above the two modulating frequencies can be in the audio range.

Preferably the transmitter I on the tractor and the receiver R in the field controller are respectively a radio transmitter and receiver. However, it is also possible to use the guide wire layout as the means for transmission wherein signals passed between the transmitter and receiver travel along the wires. In this case low frequency device included in the transmitter can be inductively coupled to the guide wires along which the tractor may be travelling at any instant and the receiver can have an inductive pick-off coil inductively coupled to the guide wire layout for example where these wires enter the field controller.

I claim:

1. An electrical guidance system for a self-propelled vehicle comprising a plurality of substantially parallel mutually-spaced electrically energisable field guide wires extending between headlands of an area of land, two headland guide wires respectively extending along said headlands transversely of said plurality of guide wires, each field wire and headland wire thereby together defining two intersecting vehicle paths, two signal wires spaced in-field of and extending parallel to the respective headland wires and each crossing the field guide wires at a predetermined distance in-field from the nearer headland wire, field control means to which the wires are connected, said field control means comprising means for energising both headland wires and for selectively energising two non-adjacent field guide wires to constitute a vehicle guide loop embracing a portion of the land area, means for energising the signal wires, vehicle borne electrical steering control means responsive to signals received from an energised guide wire for providing electrical steering signals such as to cause said vehicle to follow a path defined by said guide wire, vehicle borne electrical turn control means responsive to signals received from an energised signal wire for substituting for said electric steering signals a fixed electric signal such as to cause a turn of the vehicle away from one of said non-adjacent field guide wires to a headland guide wire, and means for selectively energising at least one other field guide wire situated between said non-adjacent field guide wires to constitute a signal wire for initiating a turn away from a headland wire to one of said non-adjacent field guide wires.

2. A system according to claim 1, wherein the ends of the field guide wires at one headland are connected to the appertaining headland wire and their other ends are connected to said field control means whereby said appertaining headland wire is energisable by said control means via two or more selected field guide wires.

3. A system according to claim 1 wherein the path following means includes a guide sensing head sensitive to energisation of a wire at a guide frequency, the turn control means includes first and second signal sensing heads for sensing energisation of a wire at a first or second signal frequency respectively, and the field control means includes alternating current sources providing said frequencies and switching means selectively operable for connecting the non-adjacent field guide wires to the guide frequency source, and at least one intermediate field guide wire to the second signal frequency source.

4. A system according to claim 3 including on the vehicle a transmitter, and transmission initiating detector means connected to said guide sensing head, at least during turning of the vehicle from one to the other of two intersecting paths, and responsive to an output from the guide sensing head indicative of alignment of the vehicle with such other path at the end of a turn for initiating transmission by the transmitter to the field control means of a conrol signal indicative of the fact, the field control means including receiver means responsive on receipt of such control signal to cause signal frequency energisation of another wire as the signal wire for initiating a subsequent turn of the vehicle.

5. A system according to claim 4, wherein said receiver means is responsive to such control signal to cause energisation as signal wires of a plurality of intermediate field guide wires between non-adjacent guide-frequency-energised field guide wires, and said turn control means includes first counting means for counting successive initiating signals from these intermediate wires as the vehicle proceeds along a headland and responsive on counting a predetermined number thereof, to initiate a turn of the vehicle off the headland path on to the next succeeding guide wire with respect to the direction of travel of the vehicle.

6. A system according to claim 4 wherein said turn control means includes second counting means connected to the transmitter and responsive on counting a predetermined number of initiating signals to cause transmission of an output signal to the field control means, on receipt of which signal the field control means is responsive to change the connections of the wires such as to form a new guide loop embracing a different portion of land.

7. A system according to claim 1 including vehicle-borne implement control means responsive to signals from said signal wires parallel to the headland wires for automatically causing an agricultural implement connected to the vehicle to start and stop working the ground as desired.

8. A system according to claim 7, wherein for energising said signal wires and said other field guide wire the field control means includes carrier frequency generating means and means for modulating said carrier frequency at two different signal frequencies and the turn initiating means includes a single signal sensing head for sensing the modulated carrier signal together with demodulating means for deriving and separating the different signal frequencies from the sensed modulated carrier signal.

9. A system as claimed in claim 1, wherein the turn control means includes delay means for introducing a predetermined delay between receipt of an initiating signal and subsequent initiation of the predetermined turning operation for the vehicle.

References Cited

UNITED STATES PATENTS 3,169,598    2/1965    Finn-Kelley et al. _____ 172—3 X
3,294,178   12/1966    Lawson et al. _____ 172—3

ROBERT E. BAGWILL, Primary Examiner

S. C. PELLEGRINO, Assistant Examiner

U.S. Cl. X.R.

180—79.1